United States Patent
Li et al.

(10) Patent No.: US 11,561,887 B2
(45) Date of Patent: Jan. 24, 2023

(54) TEST SCRIPT DEBUGGING USING AN AUTOMATED TESTING FRAMEWORK AND UI RENDERING TREE

(71) Applicant: NETEASE (HANGZHOU) NETWORK CO., LTD., Zhejiang (CN)

(72) Inventors: Xiang Li, Zhejiang (CN); Jianjun Wang, Zhejiang (CN); Xin Liu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/962,324

(22) PCT Filed: Nov. 16, 2018

(86) PCT No.: PCT/CN2018/116017
§ 371 (c)(1),
(2) Date: Jul. 15, 2020

(87) PCT Pub. No.: WO2019/144680
PCT Pub. Date: Aug. 1, 2019

(65) Prior Publication Data
US 2020/0356465 A1    Nov. 12, 2020

(30) Foreign Application Priority Data

Jan. 23, 2018  (CN) .......................... 201810062116.6

(51) Int. Cl.
*G06F 11/36* (2006.01)

(52) U.S. Cl.
CPC ...... *G06F 11/3684* (2013.01); *G06F 11/3664* (2013.01)

(58) Field of Classification Search
CPC ............................................. G06F 11/36–3696
See application file for complete search history.

(56) References Cited

U.S. PATENT DOCUMENTS 7,219,305 B2 * 5/2007 Jennings .................... G06F 8/38
715/761
7,814,463 B2 * 10/2010 Dandoy .............. G06F 11/3664
717/125

(Continued)

FOREIGN PATENT DOCUMENTS

CN    102541532 A    7/2012
CN    103678124 A    3/2014

(Continued)

OTHER PUBLICATIONS

Machine Translation of CN 106095666, Espacenet (online), 2022 [retrieved Jan. 29, 2020], Retrieved from Internet: <URL: https://worldwide.espacenet.com/publicationDetails/description?CC=CN&NR=106095666A&KC=A&FT=D&ND=3&date=20161109&DB=EPODOC&locale=en_EP>, pp. 1-41.*

(Continued)

*Primary Examiner* — Todd Aguilera
(74) *Attorney, Agent, or Firm* — Qinghong Xu

(57) ABSTRACT

An automatic testing method and apparatus are provided. In the method, a Software Development Kit (SDK) interface is configured and User Interface (UI) rendering data which includes a plurality of UI controls is obtained through the SDK interface. The UI rendering data is a standardized data structure processed through the SDK interface. An operation event of a user on the UI rendering data is received, and a simulation operation of the user on the UI rendering data on a terminal device is determined according to the operation event. Position information of a UI control corresponding to the simulation operation is determined, and a UI automated test script is determined according to the position informa- (Continued)

tion and the simulation operation. The UI automated test script is run and debugged using an automated test framework.

17 Claims, 10 Drawing Sheets

(56) References Cited

U.S. PATENT DOCUMENTS

| | | | | |
|---|---|---|---|---|
| 9,690,465 | B2* | 6/2017 | Tuck | G06F 3/048 |
| 2004/0061713 | A1* | 4/2004 | Jennings | H04L 67/34 |
| | | | | 715/700 |
| 2004/0230954 | A1* | 11/2004 | Dandoy | G06F 11/3644 |
| | | | | 717/124 |
| 2013/0321268 | A1* | 12/2013 | Tuck | G06F 3/011 |
| | | | | 345/157 |
| 2015/0067469 | A1* | 3/2015 | Shuto | G06F 40/103 |
| | | | | 715/232 |
| 2017/0228220 | A1* | 8/2017 | Dai | G06F 8/38 |
| 2018/0173614 | A1* | 6/2018 | Gong | G06F 3/0304 |
| 2020/0409830 | A1* | 12/2020 | Li | G06F 11/3664 |

FOREIGN PATENT DOCUMENTS

| | | |
|---|---|---|
| CN | 104363264 A | 2/2015 |
| CN | 104424093 A | 3/2015 |
| CN | 104516812 A | 4/2015 |
| CN | 105335283 A | 2/2016 |
| CN | 105868111 A | 8/2016 |
| CN | 105988934 A | 10/2016 |
| CN | 106095666 A | 11/2016 |
| CN | 106484622 A | 3/2017 |
| CN | 106512396 A | 3/2017 |
| CN | 107025165 A | 8/2017 |
| CN | 107577607 A | 1/2018 |
| CN | 108170611 A | 6/2018 |

OTHER PUBLICATIONS

The ISR dated Jan. 30, 2019, from application No. PCT/CN2018/116017.
The CN1OA dated Nov. 5, 2018, from application No. 201810062116.6.
The CNNOA dated Jun. 6, 2019, from application No. 201810062116.6.

* cited by examiner

TEST SCRIPT DEBUGGING USING AN AUTOMATED TESTING FRAMEWORK AND UI RENDERING TREE

This application is based on and claims priority of International Application No. PCT/CN2018/116017, filed Nov. 16, 2018, which is based upon and claims priority to Chinese Patent Application 201810062116.6, filed Jan. 23, 2018, the entire contents of which are incorporated herein by reference.

TECHNICAL FIELD

The present disclosure relates to software testing technologies, and in particular, to an automated testing method, an automated testing device, a computer-readable storage medium and an electronic device.

BACKGROUND

In the existing game testing solutions, the game script to be tested can be tested through a game test framework; a UI control to be tested can also be tested through a UI control recognition method.

However, the above testing solutions all have their detects, and thus a new automated testing method needs to be provided.

It should be noted that the information disclosed in the background section above is only used to enhance the understanding of the background of the present disclosure, and therefore may include information that does not constitute the prior art known to those skilled in the art.

SUMMARY

According to an aspect of the present disclosure, there is provided an automated testing method, including:

configuring a common Software Development Kit (SDK) interface and obtaining User Interface (UI) rendering data which includes a plurality of UI controls through the SDK interface;

receiving an operation event of a user on the UI rendering data, and determining, according to the operation event, a simulation operation of the user on the UI rendering data on a terminal device;

determining position information of a UI control corresponding to the simulation operation, and generating a UI automated test script according to the position information and the simulation operation; and running and debugging the UI automated test script using an automated test framework.

According to an aspect of the present disclosure, there is provided an automated testing device, including:

a rendering data obtaining module configured to configure a common Software Development Kit (SDK) interface and obtaining User Interface (UI) rendering data which includes a plurality of UI controls through the SDK interface;

a simulation operation determination module configured to receive an operation event of a user on the UI rendering data, and determine, according to the operation event, a simulation operation of the user on the UI rendering data on a terminal device;

a test script generation module configured to determine position information of a UI control corresponding to the simulation operation, and generate a UI automated test script according to the position information and the simulation operation; and a test script running module configured to run and debug the UI automated test script using an automated test framework.

According to an aspect of the present disclosure, there is provided an electronic device, including:

a processor; and a memory for storing instructions executable by the processor;

wherein when the instructions are executed by the processor, the processor is caused to implement the automated testing method according to the above aspect.

It should be understood that the above general description and the following detailed description are merely exemplary and explanatory, and should not limit the present disclosure.

BRIEF DESCRIPTION OF THE DRAWINGS

The drawings herein are incorporated in and constitute a part of the specification, illustrate embodiments consistent with the present disclosure, and together with the description serve to explain the principles of the present disclosure. Obviously, the drawings in the following description are only some embodiments of the present disclosure. For those of ordinary skill in the art, other drawings can be obtained based on these drawings without departing from the spirit of the present disclosure.

DETAILED DESCRIPTION

Figure 1:
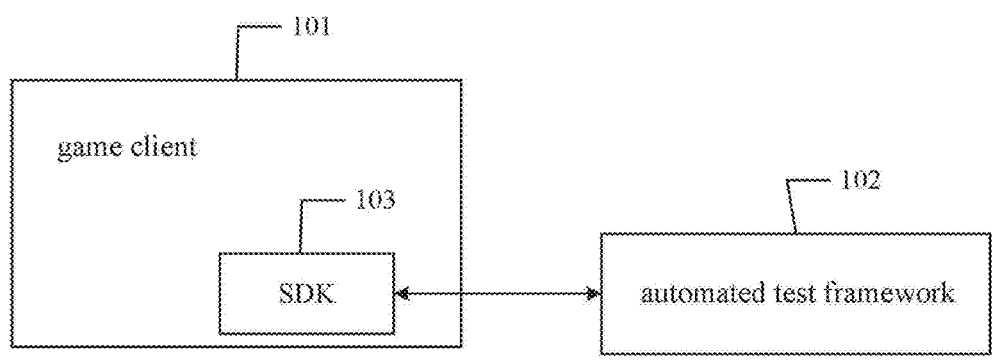
FIG. 1 is a schematic block diagram showing principles of automated testing according to some embodiments of the present disclosure.

Example embodiments will now be described more fully with reference to the accompanying drawings. However, the exemplary embodiments can be implemented in various forms and should not be construed as limited to the examples set forth herein; rather, providing these embodiments makes the present disclosure more comprehensive and complete, and conveys the concepts of the exemplary embodiments comprehensively to those skilled in the art. The described features, structures, or characteristics may be combined in any suitable manner in one or more embodiments. In the following description, numerous specific details are provided to give a full understanding of the embodiments of the present disclosure. However, those skilled in the art will realize that the technical solutions of the present disclosure may be practiced with omitting one or more of the specific details, or other methods, components, devices, steps, and so on may be adopted. In other cases, well-known technical solutions are not shown or described in detail to avoid obscure aspects of the present disclosure.

In addition, the drawings are merely schematic illustrations of the present disclosure and are not necessarily drawn to scale. The same reference numerals in the drawings represent the same or similar parts, and thus repeated descriptions thereof will be omitted. Some block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

Automated testing solutions may generally include the following two testing schemes. In a first scheme, with an image recognition based game test framework and a corresponding script production tool, a screenshot of the position where an operation needs to be performed and an operation type are recorded in a script to be tested. When running the script to be tested, the position where the operation is required is determined through the screenshot of the position, and the operation type corresponding to the script to be tested is executed to test the game script to be tested. Another scheme is based on the UI control recognition. In the scheme, all UI control data in the game is obtained (at the same time, the absolute position and other properties can be obtained), the UI control which is desired to operate is searched from the data and corresponding operation is performed on the control to complete accurate automated testing operations.

However, there are many shortcomings in the two testing schemes mentioned above.

In the first testing scheme, the defects are: in some complex image recognition scenarios, the image recognition positioning is not accurate enough, which often causes running of the test script to fail.

In the second testing scheme, the defects are as follows. On the one hand, because the engine structure of each platform is different, the framework of each automated test is different, which results in that each automated test framework can only be applied to a matched engine, and the usage scope of each automated test framework is small. On the other hand, the speed of obtaining the information of the control to be tested is slow and the abstraction of the obtaining method is not enough. Further, the coordinate system of the control to be tested is not flexible enough. Also, there is a relatively small number of supported analog input methods, and the auxiliary tools are relatively crude and inefficient.

The above-mentioned second automated testing scheme will be explained and described in more detail. In the above-mentioned second automated testing scheme, data of all UI (i.e., User Interface, a graphical representation available to a user for interaction; the interface can include multiple controls) controls in the game can be directly obtained, and then the UI control to be operated can be directly searched from the data of controls, and then corresponding operations are performed on the control to complete accurate animation test operation. Further, in the automated test scheme, a UI tree presentation and picking function for a device to provide images, as well as functions of automatically generating and running a corresponding test script and generating a report, are provided.

Further, the platforms that UI automated can be applied to include the Android platform, the IOS platform, the Windows platform, and other general platforms. The rendering of applications on the above platforms can be taken over by an operating system, that is, the applications are responsible for the style management and interaction logic for the controls, and the operating system is responsible for displaying these controls on the screen. Further, the automated framework communicates with the operating system to obtain control information (including control properties and interface layout, and the like) from corresponding interfaces. After having the information, when the automated test script is run, manual operations can be simulated, the effect of automated operations can be achieved, and finally the automated test can be completed.

Further, the UI rendering of the Web platform is independent of the operating system, and the structure and principle are much the same as those of the operating system. The Web page is responsible for managing controls and the browser is responsible for rendering. The automated framework can interact with the Web page through browser interaction to obtain the control information in the web page (interface) directly.

Because of the existence of a game engine, games and other applications behave very differently. Generally speaking, the game engine is responsible for both control management and rendering, while the rendering of other applications can be handled directly by the operating system. As a result, what the game presents before a user is a series of continuous rendered pictures, just like continuous pictures of a movie, the control information in the game cannot be obtained directly through the operating system. In this case, if you need to obtain control information from the game, you can only communicate with the game. Of course, the control management and rendering methods of different game engines are different, so the current automated frameworks of different engines also vary.

The bigger problem is that, for security reasons, game engines are generally not openly reserved for automated test interfaces. Most engines are not open source or even open. At present, there is basically no common UI automated test framework for game engines Further, the general principles of the UI automated framework for each game are similar. Here, the existing test tools are used as an example to explain the specific process of using the framework to perform test.

Referring to FIG. 1, a SDK 103 needs to be embedded in game client 101, that is, a special code module is put into a game script and run together with the game script. The SDK 103 obtains real-time control information of the game through the internal interface of the game engine when the SDK 103 is run. The automated test framework 102 communicates with the SDK outside the game to obtain the control information. The control information includes the basic elements such as the position, size, text, and name of the control. Further, the automated test may include the following operations:

Simulation operation: The test tool can generate a simulation operation, such as a simulated click at this position, to achieve the effect of clicking this control.

Analog input: Because the test tool directly uses the adb command to generate an analog input, it is only applicable to games on the Android platform.

Locating Controls: The test tool also provides APIs to obtain the controls, the controls can be obtained by attributes such as name, path, text, and wildcard path matching is also supported, such as obtaining a descendant node in a descendant of a node.

Figure 2:
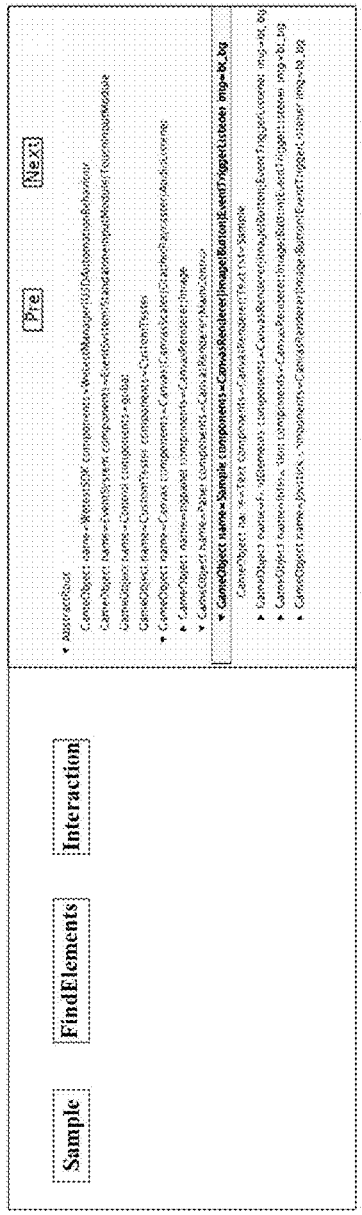
FIG. 2 is a schematic diagram illustrating a data presentation tool of a game script according to some embodiments of the present disclosure.

In addition, the test tool also provides a control viewer: View; as shown in FIG. 2. When a user manually writes a test script, this control viewer is used to actively "sync with the game" to obtain the current game screen and the control tree, and to write the script according to the obtained GameObject.

However, the above-mentioned automated testing method have the following disadvantages. On the one hand, the scope of application is small and the method is only applicable to Android-based games. On the other hand, the speed of obtaining control information is slow and the abstraction of the method is not enough. Especially when complicated conditions are given, stuck can be felt when the control is obtained. Because this test tool is only used for Android-based games, the controls are obtained according to the characteristics of Android-based games. For example, the controls are obtained according, to the Component property, the text value, picture name, and so on. Furthermore, the coordinate system of the control is not flexible enough, and the global analog input can only use absolute coordinate values. However, if an absolute coordinate position is written in a test script, the results when the script is run on terminals with different resolutions will be different, which will cause the script to run abnormally. Furthermore, there are a relatively small number of ways to support analog input, only click, swipe, long press, text input (including keys) are supported, and multi-touch, forced screen rotation, gyroscope and the like which are more complicated are not supported. Further, auxiliary tools for generating scripts and logs are relatively simple and under-used; the UI data of the current screen cannot be presented to the user in real time, and efficiency for a user to write the script is low; and no detailed script running report, is provided for the user, such as the equipment site when the script is run.

Figure 3:
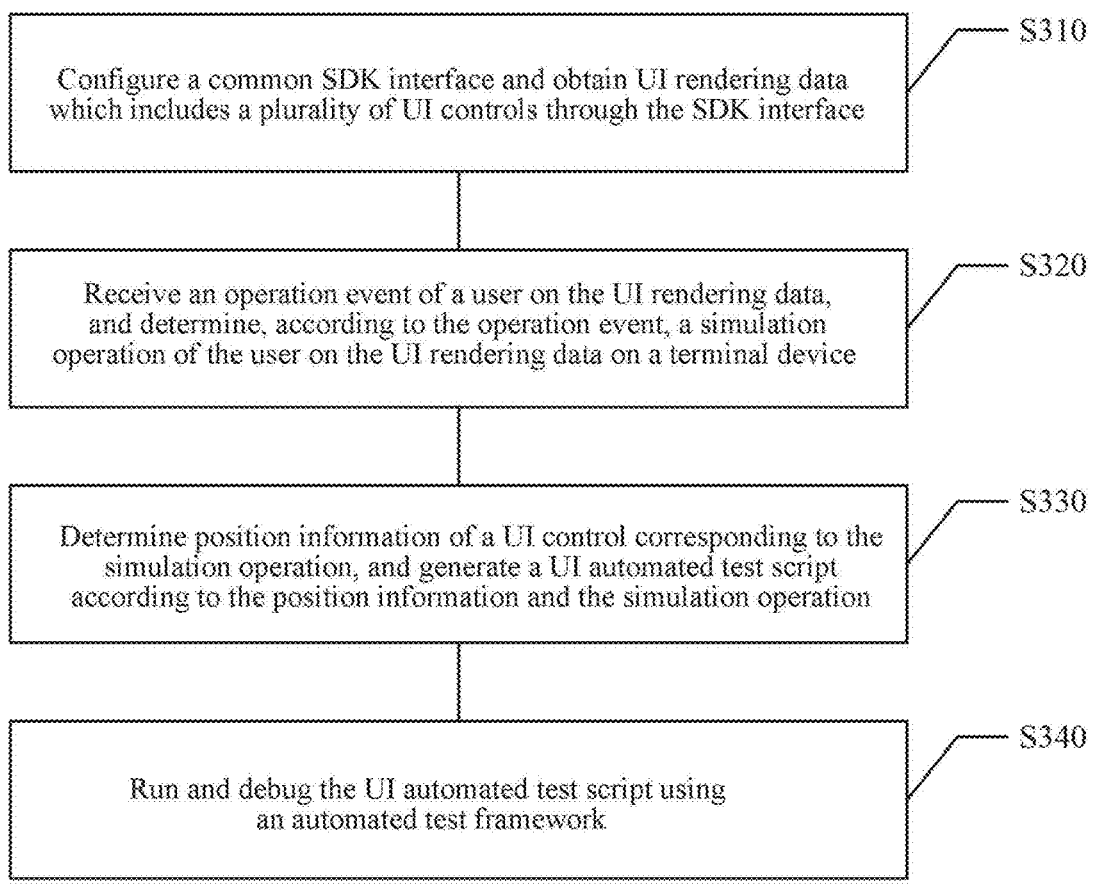
FIG. 3 is a flowchart illustrating an automated testing method according to some embodiments of the present disclosure.

An exemplary embodiment of the present disclosure provides an automated testing method. Referring to FIG. 3, the automated testing method may include the following steps.

In step S310, a common Software Development Kit (SDK) interface is configured and User Interface (UI) rendering data which includes a plurality of UI controls is obtained through the SDK interface.

In step S320, an operation event of a user on the UI rendering data is received, and according to the operation event, a simulation operation of the user on the UI rendering data on a terminal device is determined.

In step S330, position information of a UI control corresponding to the simulation operation is determined, and a UI automated test script is generated according to the position information and the simulation operation.

In step S340, the UI automated test script is run and debugged using an automated test framework.

In the automated testing method, on the one hand, by configuring the SDK interface and obtaining UI rendering data through the interface, the method can address the problem in related art that the usage scope of each automated test framework is small due to different engine structures, and the application scope of the automated testing method is increased. On the other hand, the user's second touch operation on the terminal device is determined based on the first touch operation and an automated test script is generated, and then the automated test script is run. Thus, the need for automated test on the terminal device is avoided. This method increases the speed of automated test and also improves the accuracy of automated test results.

Hereinafter, each step in the above-mentioned automated testing method according to exemplary embodiments will be explained in detail with reference to the accompanying drawings.

Referring to FIG. 3, in step S310, a common SDK interface is configured and User interface (UI) rendering data which includes a plurality of UI controls is obtained through the SDK interface.

First, a basic SDK (Software Development Kit, which can include utility tools for debugging and other purposes) standard is configured. The SDK standard can include a common SDK interface and a basic SDK model. Further, according to the SDK standard, the SDK interface and the basic SDK model can be implemented correspondingly on different engines, and different programming languages may follow the same interface and model specifications to implement the SDK interface and the basic SDK model. What needs to be added here is that the SDK code needs to be incorporated in the game, and the automated framework obtains structured UI rendering data by communicating with the SDK. The SDK code is different for each engine, and the specific code is strictly in accordance with the model definition given in the present disclosure and the code is embedded in the game. The SDK is responsible for obtaining UI rendering data through the engine interface in the game and processing the standard data structure defined in the present disclosure.

Second, the basic SDK model may include AbstractNode (the abstract model for control nodes). AbstractDumper (the abstract model for control node traversal), Selector (the abstract model for control node positioning), and DefaultMatcher (the abstract model for default matching).

AbstractNode can contain a parent-child hierarchy access method and an attribute enumeration method. Further, through the parent-child hierarchy access interface method, all associated objects of the control node can be accessed to implement the traversal function. The interface method of attribute enumeration can obtain attributes of the node, such as the name, path, and text of the node, and so on.

AbstractDumper can implement the control node dump algorithm. Through iterative traversal, control node data and hierarchical relationships are exported according to a desired data format. The algorithm implementation can include the following steps. First, the hierarchy of all control nodes is a tree structure, and each node is of a type of AbstractNode. The root node is obtained, and the attribute enumeration interface method in the root node is used to obtain all the attributes of the node. Then, the parent-child hierarchy access method in the root node is used to obtain the child nodes directly under the node. If the number of child nodes is not zero, each child node is used as a root node, and the previous step is repeated, and the return value is stored. Finally, the root node information and child node information are organized according to a fixed format.

The Selector can implement a general Select algorithm based on the AbstractNode method. The Select algorithm refers to traversing all nodes and returning nodes that meet given conditions (multiple nodes may be returned). Further, the core steps of the Select algorithm are similar to the dump algorithm, and conditions are judged for nodes when controls are traversed (the method of the DefaultMatcher class will be used in the judgment). If a node meets the given conditions, the node will be added to the returned result.

The DefaultMatcher provides a default match method, which is applied in the Select algorithm. The Select algorithm determines whether to include this node in the returned result according to the result obtained by the match.

Then, the SDK interface is used to obtain UI rendering data including multiple UI controls. By obtaining the UI rendering data including a plurality of UI controls through the SDK interface, the data structure of the UI rendering data can be unified, the cross-engine test can be realized, and the applicable range of the automated testing method is widened. Further, it should be noted that the abstract model and abstract method in the above SDK standard can be called rules. In the implementation of specific rules, APIs provided by an engine are used to implement corresponding abstract methods, and these methods are encapsulated into rpc methods. After implementation, the interface for each test framework is the same when called. For each automated test framework, the SDKs of various engine versions have the same public rpc method which can be called, and the differences between the engines have been eliminated, thus achieving cross-engine test.

With continued reference to FIG. 3, in step S320, a user operation event on the UI rendering data is received and a simulation operation of the user on the UI rendering data on the terminal device is determined according to the operation event.

In an exemplary embodiment, first, a user operation event on UI rendering data is received. The operation event may include MotionEvent: all screen touch-related operations, each touch point has three actions, i.e., pressing, moving, and lifting. Performing operations on multiple points is multi-touch, and the event set of all points is MotionEvent. KeyEvent refers to a key event corresponding to keyboard, HOME, BACK, and so on. There are two actions: pressing and lifting, similarly to MotionEvent. SensorEvent refers to a sensor event which simulates setting of a sensor value, and so on. Second, the user's simulation operation on the UT rendering data on the terminal device is determined based on the touch operation. For example, when the first touch operation is pressing and lifting, it can be determined that the user's second touch operation on the rendering data on the terminal device is tapping once. When the first touch operation is pressing, moving and lifting, it can be determined that the user's second touch operation on the UI rendering data on the terminal device is moving an APP on the mobile terminal device.

Figure 4:
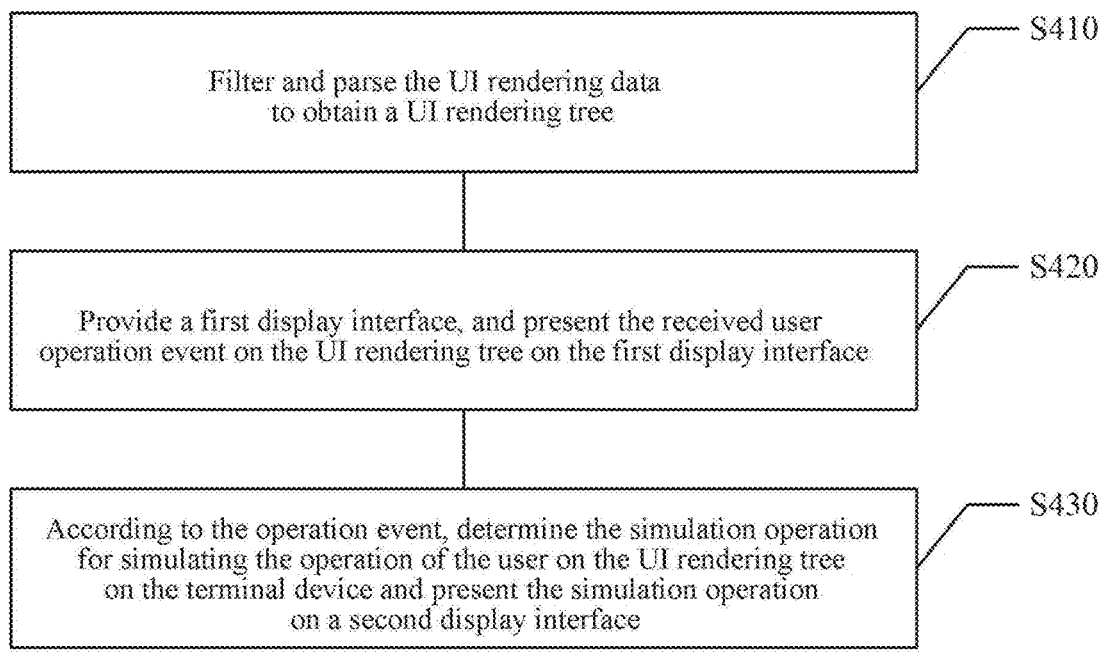
FIG. 4 is a flowchart illustrating a method for receiving a user operation event on UI rendering data and determining the user's simulation operation on the UI rendering data on a terminal device according to the operation event according to some embodiments of the present disclosure.

FIG. 4 schematically illustrates a flowchart of a method for receiving an operation event of a user on the UI rendering data and determining, according to the operation event, a simulation operation of the user on the UI rendering data on a terminal device. Referring to FIG. 4, the method may include steps S410-S430:

In step S410, the UI rendering data is filtered and parsed to obtain a UI rendering tree.

In step S420, a first display interface is provided, and the received user operation event on the UI rendering tree is presented on the first display interface.

In step S430, according to the operation event, the simulation operation for simulating the operation of the user on the UI rendering tree on the terminal device is determined and the simulation operation is presented on a second display interface.

Figure 5:
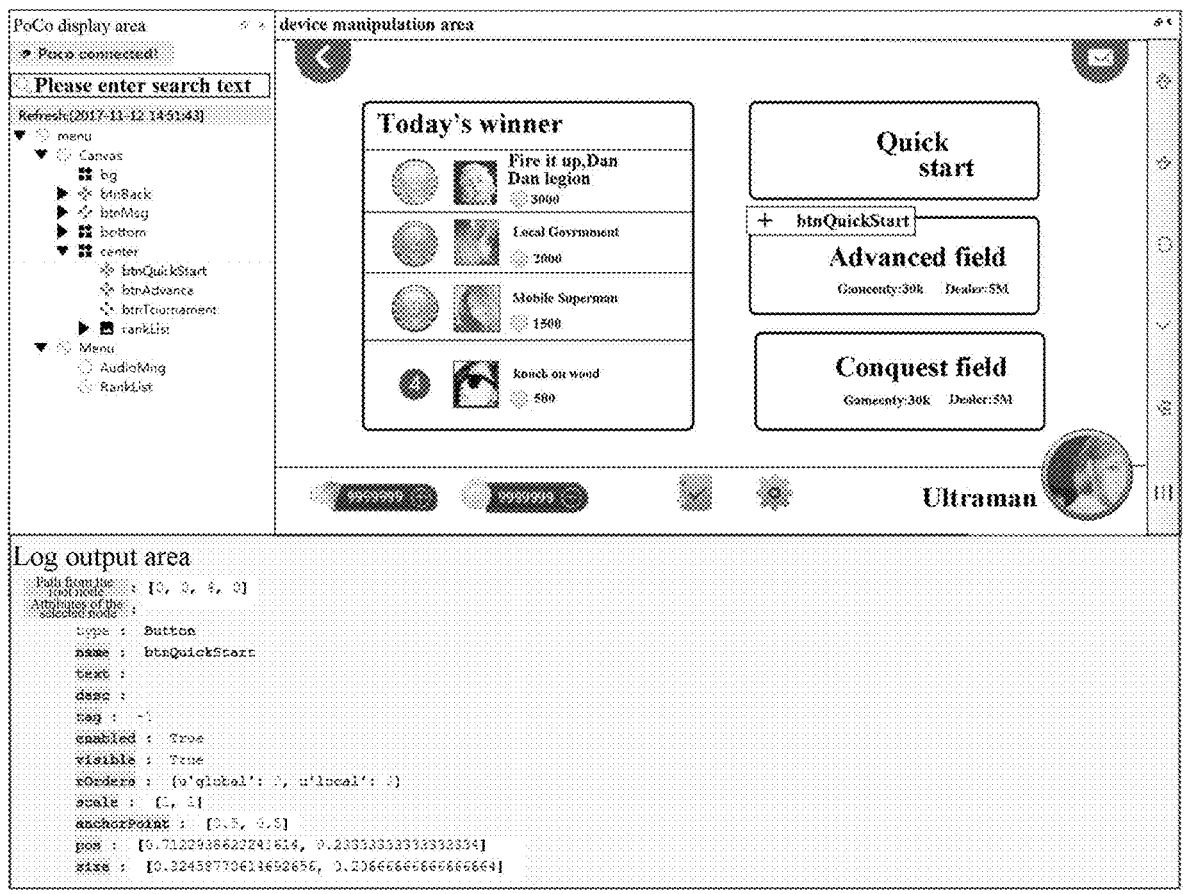
FIG. 5 is a schematic diagram illustrating the working principle of an automated test framework according to some embodiments of the present disclosure.

The above steps S410 to S430 are explained and described below. First, after obtaining UI rendering data including a plurality of UI controls, the UI rendering data is filtered and parsed to obtain a UI rendering tree as shown in the upper left corner of FIG. 5. A parent node in the UI rendering tree can include for example a Menu (menu bar), the parent node can also include multiple child nodes, such as btnback, brnmsg, and center, and other child nodes, such as ranklist and audioMng, and so on. However, the present disclosure is not limited to the UI rendering tree as shown in FIG. 5. Secondly, after the UI rendering tree is obtained, an analog input interface is configured, and a user's operation event on the UI rendering data is received by using the analog input interface. Then, a display interface is provided and the received user's operation event on the UI rendering data is presented on the first display interface. For example, referring to FIG. 5, when the user clicks or taps "btnQuickStart" (quick start), a box is displayed around the quick start control to indicate that the user has generated an operation event on the quick start control. Further, the user's simulation operation on the UI rendering tree on the terminal device is determined according to the operation event and the simulation operation is presented on a second display interface (the display interface of the terminal device). For example, when the user clicks or taps the quick start control, a click or tap operation on the quick start control is simulated on the display interface of the terminal device, and a box is also displayed around the quick start control on the display interface of the terminal device.

With continued reference to FIG. 3, in step S330, position information of a UI control corresponding to the simulation operation is determined, and a UI automated test script is generated according to the position information and the simulation operation. Details are as follows.

First, position information of a UI control corresponding to the simulation operation is determined. Determining position information of the UI control corresponding to the simulation operation may include: under the inspector mode or the automatic recording mode, marking the position information of the UI control corresponding to the simulation operation in a form of a preset identifier. Secondly, a UI automated test script is generated according to the position information and the simulation operation. Further, a comment box corresponding to the UI control is added at a preset position of the preset identifier, and the comment box is presented on the first interface. The comment box includes at least two of an icon, a control type, and a control name corresponding to the UI control.

Figure 6:
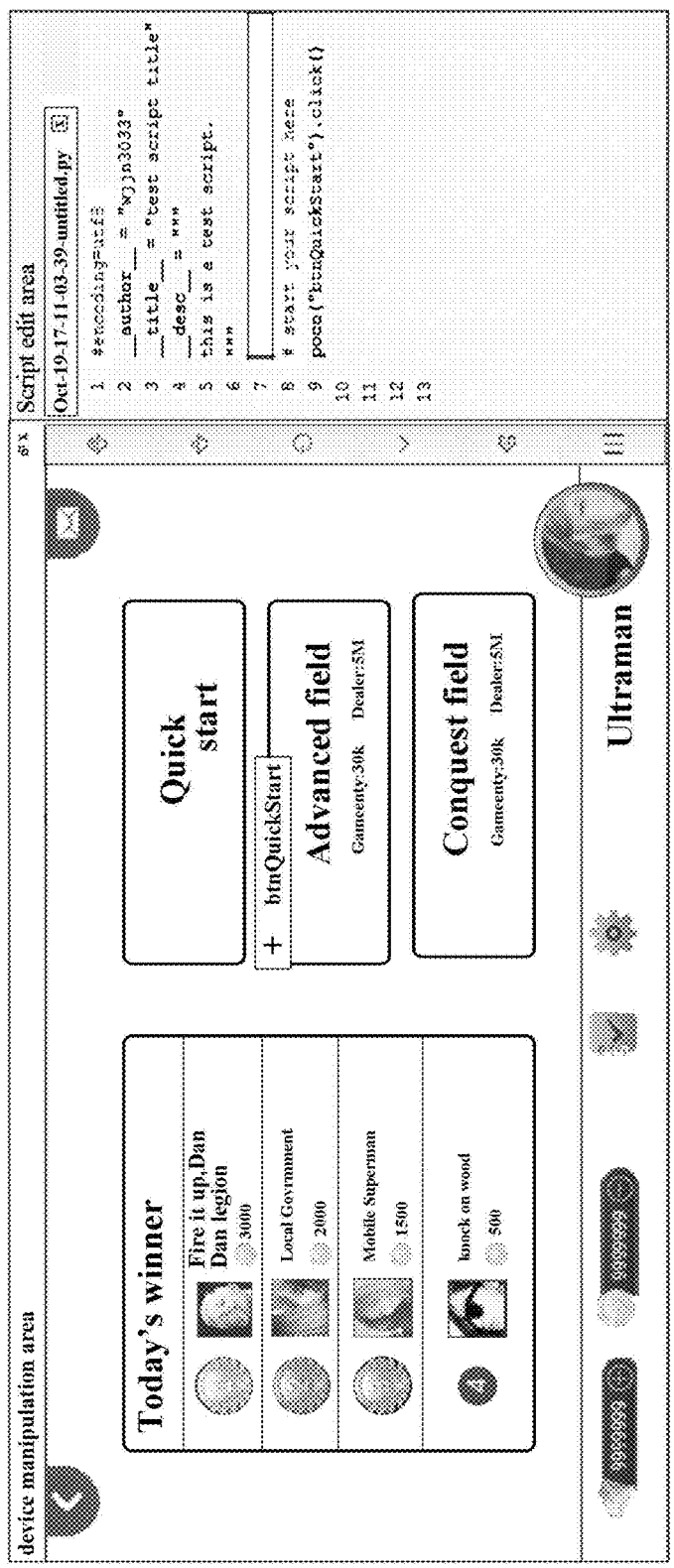
FIG. 6 is a schematic diagram illustrating an automatic recording mode according to some embodiments of the present disclosure.

For example, when the user selects the "Inspector" mode, the device screen and the UI data are frozen. When the user moves the mouse in the device screen, the control box at the corresponding position is automatically circled in the form of a transparent frame, and a comment box is added around the transparent box. The comment box includes the icon, control type, control name and other properties corresponding to the control (for a specific effect, refer to FIG. 5). The position of the comment box is preferentially left-aligned below the transparent box. In order to ensure the display inside the device screen, the automated test framework calculates the width and height of the comment box. If the position below the transparent box is not enough, the comment box is moved to the upper left-aligned position. Further, if it is found that the right side of the transparent box goes beyond the device area when the comment box is left-aligned with the transparent box the comment box is shifted to the left until the comment box is flush with the device area. Further, referring to FIG. 6, in the automated test framework, when an entry in the tree structure on the left is selected, the right device screen displays the selection effect of the transparent box of the corresponding control. Also, when the user slides in the device area with the mouse and clicks or taps on a control, the corresponding control entry in the tree structure diagram on the left will show the selected effect. If the expanded list of the tree diagram is too long, the tree diagram will automatically scroll to the corresponding control. When the user selects a control, all attributes corresponding to the control will be displayed in the output window, which can be used when the user writes the script.

Figure 7:
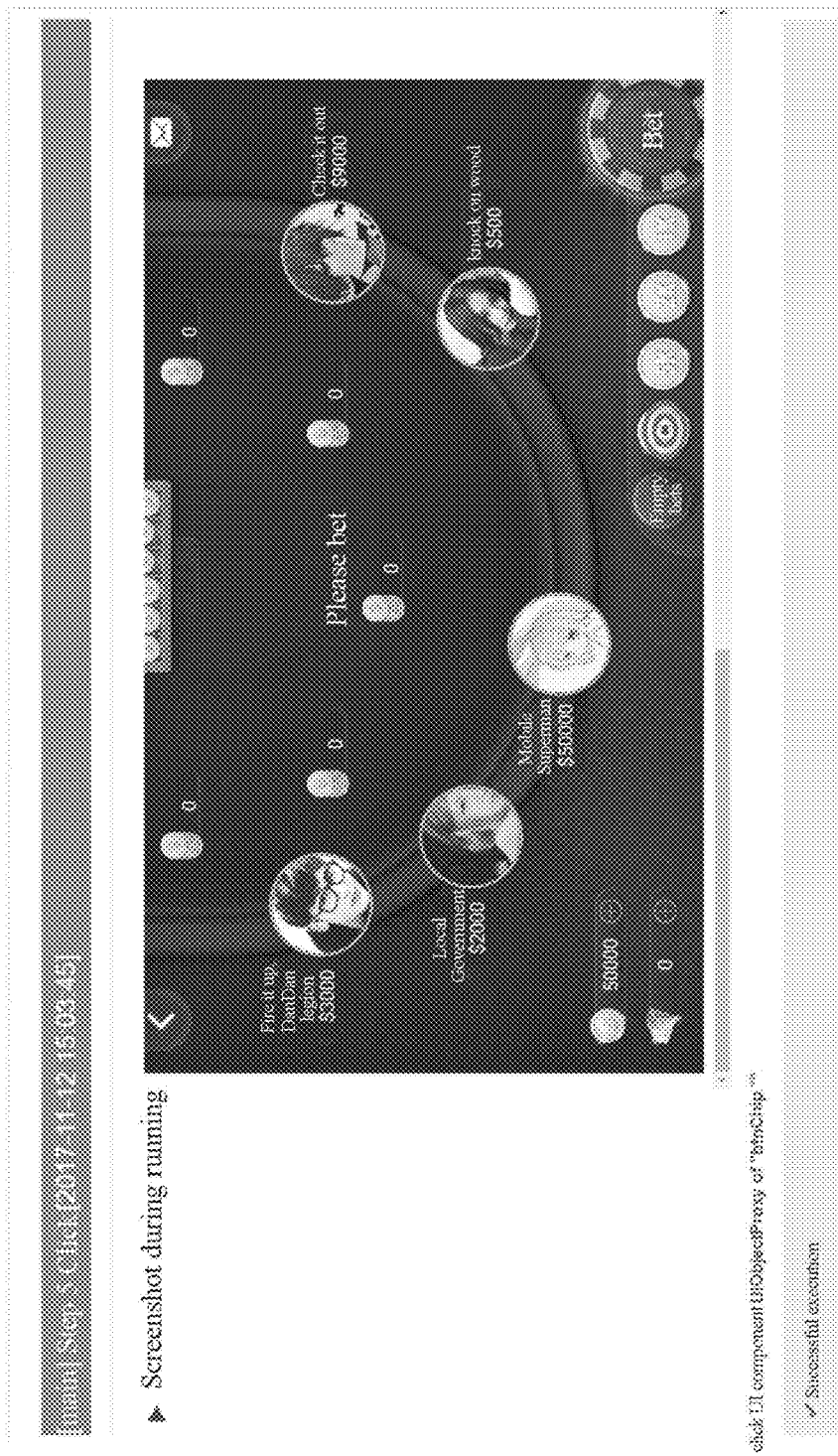
FIG. 7 is a schematic diagram illustrating an operation report according to some embodiments of the present disclosure.

Secondly, when the user selects the "automatic recording mode (Record)", the device screen and the UI data will be refreshed normally. When the user moves the mouse in the device screen, the range of the control at the corresponding position is automatically circled in the form of a transparent frame and a comment box is added around the transparent box. The comment box includes attributes of the control such as the icon, the control type, the control name and so on. When a user performs an operation on the device, a corresponding operation script is automatically generated in the script area. When the user performs an operation, the UI data is continuously refreshed. If the device space interface changes, the user can continue to a next operation, and the automated test framework continues to automatically generate the script to be tested until the user completes the operation and ends the script recording. After writing the test script in the UI automated framework, the user can click to run directly. After the running is finished, the log generated by the script can be viewed with one click or tap. Further, during running, device screenshots, operation positions, and control information corresponding to the operation can be saved. When generating a report, the recorded running data is be generated into an HTML web page, and according to the operation sequence, device screenshots, positions of the operated controls, and sizes of the operated controls are circled with corresponding marks. The specific results can be shown in FIG. 7.

Further, in order to unify the position information of devices of different resolutions, normalization process may be performed on the position information. The normalization process may be a percentage of the coordinate value in the position information relative to the screen of the display device. Further, normalizing the position information may include: performing a quotient operation on an abscissa in the position information and a width value of a screen resolution of a display device to obtain a standard abscissa; and performing a quotient operation on an ordinate in the position information and a height value of the screen resolution of the display device to obtain a standard ordinate.

The above steps are explained as below. The abscissa (x value) in the position information can be divided by the screen width of the display device to obtain the standard abscissa; the ordinate (y value) in the position information can be divided by the long side (height) of the screen of the display device. Further, because the standard abscissa and the standard ordinate are percentages relative to the screen of the display device, the method can be applied to different display screens. Therefore, for devices with different resolutions, the percentage values are constant.

With continued reference to FIG. 3, in step S340, the UI automated test script is run and debugged using an automated test framework to complete the test of the UI automated test script.

In an exemplary embodiment, after the UI automated test script is obtained, the UI automated test script can be run, and the UI automated test script is debugged according to the running result, so as to complete the test of the UI automated test script, and at the same time complete automated test of the UI control.

Further, after the test of the above UI automated test script is completed, a test log may be generated. The generation of the log may include: generating a test log corresponding to the UI automated test script, and writing a script to be tested according to the test log. Writing the script to be tested according to the test log may include: configuring a script writing assistive tool, and writing the script to be tested based on the test log and using the script writing assistive tool.

In an integrated UI automated test framework, when a test log corresponding to the UI automated test script is generated, in order to enable a more comprehensive test of each UI control, a script to be tested including a plurality of UI controls may be written according to the test log of the UI controls. Further, in order to increase the writing speed of the script to be tested, a script writing assistive tool can be used to write the script to be tested.

Figure 8:
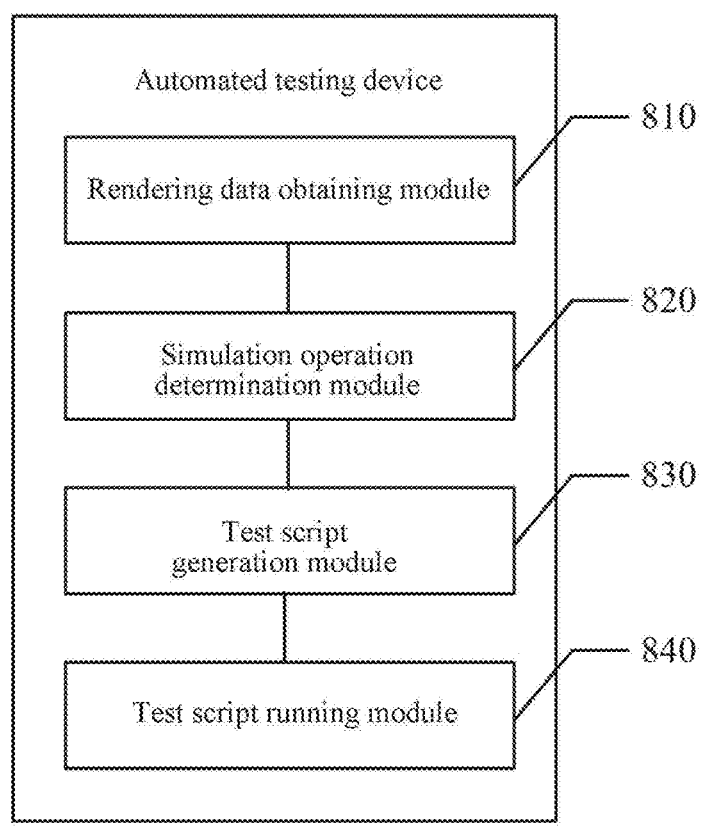
FIG. 8 is a block diagram illustrating an automated testing device according to some embodiments of the present disclosure.

An embodiment of the present disclosure also provides an automated testing device. As shown in FIG. 8, the automated testing device may include a rendering data obtaining module 810, a simulation operation determination module 820, a test script generation module 830 and a test script running module 840.

The rendering data obtaining module 810 is configured to configure a common Software Development Kit (SDK) interface and obtaining User Interface (UI) rendering data which includes a plurality of UI controls through the SDK interface.

The simulation operation determination module 820 is configured to receive an operation event of a user on the UI rendering data, and determine, according to the operation event, a simulation operation of the user on the UI rendering data on a terminal device.

The test script generation module 830 is configured to determine position information of a UI control corresponding to the simulation operation, and generate a UI automated test script according to the position information and the simulation operation.

The test script running module 840 is configured to run and debug the UI automated test script using an automated test framework.

Details regarding the exemplary embodiments of automated testing device can be found in the above descriptions regarding the method embodiments, and repeated descriptions are omitted here.

It should be noted that although several modules or units of the devices for action execution are described above, such division is not mandatory. In fact, according to the embodiments of the present disclosure, the features and functions of two or more modules or units described above may be embodied in one module or unit. Conversely, the features and functions of a module or unit described above can be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Through the description of the foregoing embodiments, those skilled in the art can easily understand that the exemplary embodiments described herein can be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, and so on) or on a network. The software product may include instructions to cause a computing device (which may be a personal computer, a server, a mobile terminal, or a network device, and so on) to perform methods according to embodiments of the present disclosure.

An exemplary embodiment of the present disclosure also provides an electronic device capable of implementing the above methods.

Those skilled in the art can understand that various aspects of the present disclosure may be implemented as a system, method, or program product. Therefore, various aspects of the present disclosure can be embodied in the following forms: a complete hardware implementation, a complete software implementation (including firmware, microcode, etc.), or a combination of hardware and software, which can be collectively referred to as "circuit", "module', or "system".

An electronic device 900 according to an exemplary embodiment of the present disclosure is described below with reference to FIG. 9. The electronic device 900 shown in FIG. 9 is only an example, and should not impose any limitation on the functions and scope of use of the embodiments of the present disclosure.

Figure 9:
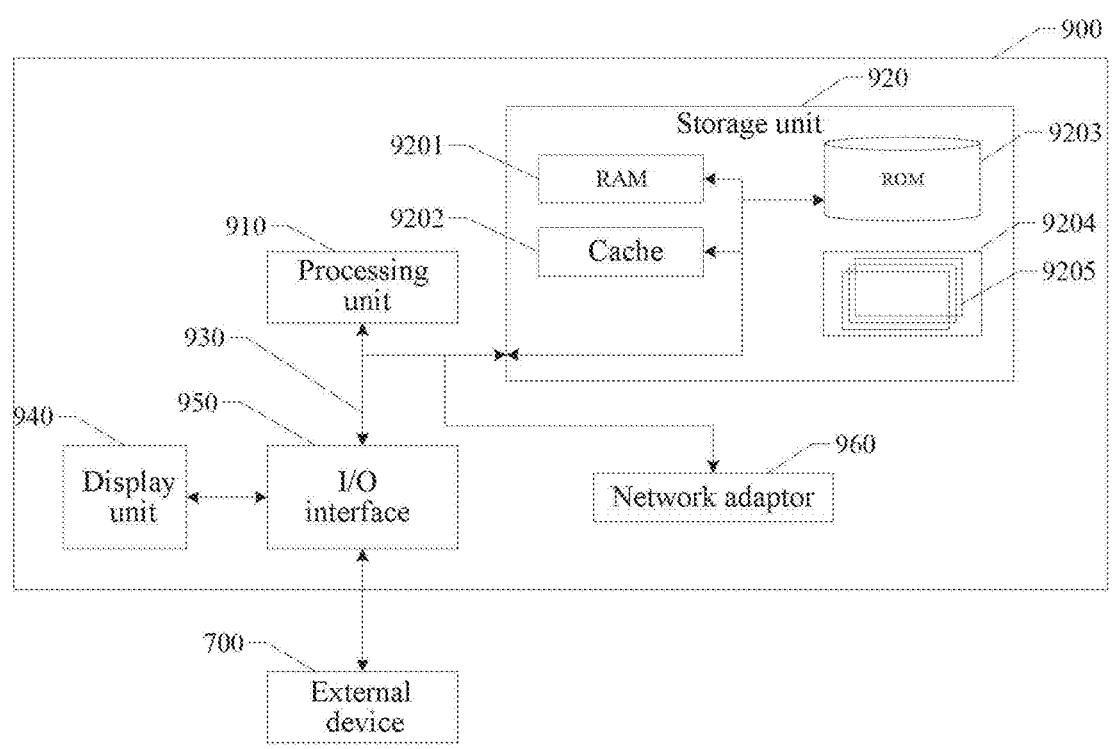
FIG. 9 is a block diagram illustrating an electronic device for implementing the above-mentioned automated testing methods according to some embodiments of the present disclosure.

As shown in FIG. 9, the electronic device 900 is shown in the form of a general-purpose computing device. The components of the electronic device 900 may include, but are not limited to, at least one processing unit 910, at least one storage unit 920, and a bus 930 connecting different system components (including the storage unit 920 and the processing unit 910) and a display unit 940.

The storage unit stores program codes, and the program codes can be executed by the processing unit 910, so that the processing unit 910 executes various exemplary embodiments according to the present disclosure described in the "exemplary methods" section of the present specification. For example, the processing unit 910 may perform the steps shown in FIG. 3. In step S310, a common SDK interface is configured and UI rendering data which includes a plurality of UI controls is obtained through the SDK interface. In S320, an operation event of a user on the UI rendering data is received, and according to the operation event, a simulation operation of the user on the UI rendering data on a terminal device is determined. In S330, position information of a UI control corresponding to the simulation operation is determined, and a UI automated test script is generated according to the position information and the simulation operation. In step S340, the UI automated test script is run and debugged using an automated test framework.

The storage unit 920 may include a readable medium in the form of a volatile storage unit, such as a random access storage unit (RAM) 9201 and/or a cache storage unit 9202, and may further include a read-only storage unit (ROM) 9203.

The storage unit 920 may further include a program/utility tool 9204 having a set (at least one) of program modules 9205. Such program modules 9205 include, but are not limited to, an operating system, one or more application programs, other program modules, and program data. Each or some combination of these examples may include an implementation of a network environment.

The bus 930 may be one or more of several types of bus structures, including a memory unit bus or a memory unit controller, a peripheral bus, a graphics acceleration port, a processing unit, or a local area bus using any bus structure in a variety of bus structures.

The electronic device 900 may also communicate with one or more external devices 700 (such as a keyboard, a pointing device, a Bluetooth device, etc.), and may also communicate with one or more devices that enable a user to interact with the electronic device 900, and/or may also communicate with any device (such as a router, a modem) that can enable the electronic device 900 to interact with one or more other computing devices. Such communication can be performed through an input/output (I/O) interface 950. Moreover, the electronic device 900 may also communicate with one or more networks (such as a local area network (LAN), a wide area network (WAN), and/or a public network, such as the Internet) through the network adapter 960. As shown in the figure, the network adapter 960 communicates with other modules of the electronic device 900 through the bus 930. It should be understood that although not shown in the figure, other hardware and/or software modules may be used in conjunction with the electronic device 900, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein can be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the methods according to exemplary embodiments of the present disclosure.

An exemplary embodiment of the present disclosure also provides a computer-readable storage medium having stored thereon a program product capable of implementing the above methods according to embodiments of the present disclosure. In some possible implementations, aspects of the present disclosure may also be implemented in the form of a program product, which includes program codes. When the program product is run on a terminal device, the program codes are used to cause the terminal device to perform the steps according to various exemplary embodiments of the present disclosure described in the above-mentioned exemplary methods.

Figure 10:
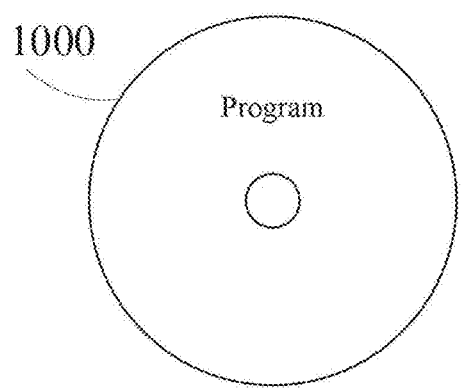
FIG. 10 illustrates a computer-readable storage medium for implementing the above-mentioned automated testing methods according to some embodiments of the present disclosure.

FIG. 10 shows a program product 1000 for implementing the above methods according to an exemplary embodiment of the present disclosure. The program product 1000 may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used by an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure can be written in any combination of one or more programming languages, which include object-oriented programming languages, such as Java, C++, and so on. The programming languages also include conventional procedural programming language, such as "C" or a similar programming language. The program codes can be executed entirely on the user computing device, can be executed partly on the user device, can be executed as an independent software package, can be executed partly on the user computing device and partly on a remote computing device, or can be executed entirely on the remote computing device or server. In the case of a remote computing device, the remote computing device can be connected to the user computing device through any kind of network, including a local area network (LAN) or a wide area network (WAN), or the remote computing device can be connected to an external computing device, for example, by the Internet provided by the Internet service providers.

In addition, the drawings are merely schematic descriptions of processes included in the methods according to exemplary embodiments of the present disclosure, and are not for limiting the present disclosure. It is easy to understand that the processes shown in the drawings do not indicate or limit the chronological order of these processes. In addition, it is also easy to understand that these processes may be performed synchronously or asynchronously in multiple modules, for example.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. An automated testing method, comprising:
    configuring a Software Development Kit (SDK) interface and obtaining User Interface (UI) rendering data which comprises a plurality of UI controls through the SDK interface, wherein the SDK interface is responsible for obtaining the UI rendering data through an engine interface of a game engine and processing the UI rendering data as a standardized data structure according to a SDK model;
    receiving an operation event of a user on the UI rendering data, and determining, according to the operation event, a simulation operation of the user on the UI rendering data on a terminal device, wherein determination of the simulation operation of the user on the UI rendering data, comprises:
        filtering and parsing the standardized data structure from the SDK interface to obtain a UI rendering tree;
        providing a first display interface, and presenting the received user operation event on the UI rendering tree on the first display interface; and
        determining, according to the operation event, the simulation operation of the user on the UI rendering tree on the terminal device and presenting the simulation operation on a second display interface;
    after presenting the simulation operation on the UI rendering tree, determining position information of a UI control corresponding to the simulation operation, and generating a UI automated test script according to the position information and the simulation operation; and
    running and debugging the UI automated test script using an automated test framework.

2. The automated testing method according to claim 1, wherein the automated test framework comprises an inspector mode and an automatic recording mode;
    wherein determining position information of a UI control corresponding to the simulation operation, comprises:
    under the inspector mode or the automatic recording mode, marking the position information of the UI control corresponding to the simulation operation in a form of a preset identifier.

3. The automated testing method according to claim 2, wherein after marking the position information of the UI control corresponding to the simulation operation in the form of the preset identifier, the automated testing method further comprises:
    adding a comment box corresponding to the UI control at a preset position of the preset identifier, and presenting the comment box on the first display interface;
    wherein the comment box comprises at least two of an icon, a control type, and a control name corresponding to the UI control.

4. The automated testing method according to claim 1, wherein after determining the position information of the UI control corresponding to the simulation operation, the automated testing method further comprises:
    normalizing the position information.

5. The automated testing method according to claim 4, wherein normalizing the position information comprises:
    performing a quotient operation on an abscissa in the position information and a width value of a screen resolution of a display device to obtain a standard abscissa; and performing a quotient operation on an ordinate in the position information and a height value of the screen resolution of the display device to obtain a standard ordinate.

6. The automated testing method according to claim 1, wherein after running and debugging the UI automated test script, the automated testing method further comprises:
generating a test log corresponding to the UI automated test script, and writing a script to be tested according to the test log.

7. A non-transitory computer-readable storage medium having stored thereon computer programs which, when executed by a processor, implement the automated testing method, comprising:
configuring a Software Development Kit (SDK) interface and obtaining User Interface (UI) rendering data which comprises a plurality of UI controls through the SDK interface, wherein the SDK interface is responsible for obtaining the UI rendering data through an engine interface of a game engine and processing the UI rendering data as a standardized data structure according to a SDK model;
receiving an operation event of a user on the UI rendering data, and determining, according to the operation event, a simulation operation of the user on the UI rendering data on a terminal device, wherein determination of the simulation operation of the user on the UI rendering data, comprises:
filtering and parsing the standardized data structure from the SDK interface to obtain a UI rendering tree;
providing a first display interface, and presenting the received user operation event on the UI rendering tree on the first display interface; and
after presenting the simulation operation on the UI rendering tree, determining, according to the operation event, the simulation operation of the user on the UI rendering tree on the terminal device and presenting the simulation operation on a second display interface;
determining position information of a UI control corresponding to the simulation operation, and generating a UI automated test script according to the position information and the simulation operation; and
running and debugging the UI automated test script using an automated test framework.

8. The non-transitory computer-readable storage medium according to claim 7, wherein the automated test framework comprises an inspector mode and an automatic recording mode;
wherein determining position information of a UI control corresponding to the simulation operation, comprises:
under the inspector mode or the automatic recording mode, marking the position information of the UI control corresponding to the simulation operation in a form of a preset identifier.

9. The non-transitory computer-readable storage medium according to claim 8, wherein after marking the position information of the UI control corresponding to the simulation operation in the form of the preset identifier, the automated testing method further comprises:
adding a comment box corresponding to the UI control at a preset position of the preset identifier, and presenting the comment box on the first display interface;
wherein the comment box comprises at least two of an icon, a control type, and a control name corresponding to the UI control.

10. The non-transitory computer-readable storage medium according to claim 7, wherein after determining the position information of the UI control corresponding to the simulation operation, the automated testing method further comprises:
normalizing the position information.

11. The non-transitory computer-readable storage medium according to claim 10, wherein normalizing the position information comprises:
performing a quotient operation on an abscissa in the position information and a width value of a screen resolution of a display device to obtain a standard abscissa; and
performing a quotient operation on an ordinate in the position information and a height value of the screen resolution of the display device to obtain a standard ordinate.

12. The non-transitory computer-readable storage medium according to claim 7, wherein after running and debugging the UI automated test script, the automated testing method further comprises:
generating a test log corresponding to the UI automated test script, and writing a script to be tested according to the test log.

13. An electronic device, comprising:
a processor; and
a memory for storing instructions executable by the processor;
wherein when the instructions are executed by the processor, the processor is caused to;
configure a Software Development Kit (SDK) interface and obtain User Interface (UI) rendering data which comprises a plurality of UI controls through the SDK interface, wherein the SDK interface is responsible for obtaining the UI rendering data through an engine interface of a game engine and processing the UI rendering data as a standardized data structure according to a SDK model;
receive an operation event of a user on the UI rendering data, and determine, according to the operation event, a simulation operation of the user on the UI rendering data on a terminal device, wherein determination of the simulation operation of the user on the UI rendering data, comprises:
filtering and parsing the standardized data structure from the SDK interface to obtain a UI rendering tree;
providing a first display interface, and presenting the received user operation event on the UI rendering tree on the first display interface; and
after presenting the simulation operation on the UI rendering tree, determining, according to the operation event, the simulation operation of the user on the UI rendering tree on the terminal device and presenting the simulation operation on a second display interface;
determine position information of a UI control corresponding to the simulation operation, and generate a UI automated test script according to the position information and the simulation operation; and
run and debug the UI automated test script using an automated test framework.

14. The electronic device according to claim 13, wherein the automated test framework comprises an inspector mode and an automatic recording mode;
wherein the processor is configured to:
under the inspector mode or the automatic recording mode, mark the position information of the UI control corresponding to the simulation operation in a form of a preset identifier.

15. The electronic device according to claim 14, wherein after marking the position information of the UI control corresponding to the simulation operation in the form of the preset identifier, the processor is further configured to:
- add a comment box corresponding to the UI control at a preset position of the preset identifier, and presenting the comment box on the first display interface;
- wherein the comment box comprises at least two of an icon, a control type, and a control name corresponding to the UI control.

16. The electronic device according to claim 13, wherein the processor is configured to:
- after the position information of the UI control corresponding to the simulation operation is determined, normalize the position information.

17. The electronic device according to claim 16, wherein the processor is configured to:
- perform a quotient operation on an abscissa in the position information and a width value of a screen resolution of a display device to obtain a standard abscissa; and perform a quotient operation on an ordinate in the position information and a height value of the screen resolution of the display device to obtain a standard ordinate.

\* \* \* \* \*